(12) United States Patent
Li et al.

(10) Patent No.: US 11,284,447 B2
(45) Date of Patent: Mar. 22, 2022

(54) GROUP-BASED SYSTEM INFORMATION COMMUNICATION

(71) Applicant: ZTE Corporation, Guangdong (CN)

(72) Inventors: Wenting Li, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 28 days.

(21) Appl. No.: 16/926,424

(22) Filed: Jul. 10, 2020

(65) Prior Publication Data

US 2020/0344814 A1  Oct. 29, 2020

Related U.S. Application Data

(63) Continuation of application No. PCT/CN2018/072267, filed on Jan. 11, 2018.

(51) Int. Cl.
*H04W 74/08* (2009.01)
*H04W 48/14* (2009.01)

(52) U.S. Cl.
CPC ....... *H04W 74/0833* (2013.01); *H04W 48/14* (2013.01)

(58) Field of Classification Search
None
See application file for complete search history.

(56) References Cited

U.S. PATENT DOCUMENTS

2017/0251500 A1\* 8/2017 Agiwal ............ H04W 72/0413
2017/0332372 A1  11/2017 Lee et al.
2019/0297563 A1\* 9/2019 Sharma ................ H04W 48/06

FOREIGN PATENT DOCUMENTS

CN  107079385 A  8/2017
WO  2017135051 A1  8/2017

OTHER PUBLICATIONS

Samsung, "On Demand SI Delivery: Signaling Aspects," 3GPP TSG-RAN WG2 NR, Spokane, United States of America, R2-1700011, 5 pages, Jan. 2017.
Fujitsu, "Considerations of on-demand SI request," 3GPP TSG-RAN WG2 Meeting #97bis, Spokane, United States of America, R2-1703234, 4 pages, Apr. 2017.
Xiaomi, "Remain issues of on-demand SI," 3GPP TSG-RAN NR #2, Qingdao, China, R2-1707456, 5 pages, Jun. 2017.
Huawei et al., "On demand SI acquisition and failure handling," 3GPP TSG-RAN WG2 Meeting #100, Reno, United States of America, R2-1713288, 8 pages, Nov. 2017.

(Continued)

*Primary Examiner* — Hong S Cho
(74) *Attorney, Agent, or Firm* — Perkins Coie LLP

(57) ABSTRACT

Described are methods, systems and devices for group-based system information (SI) communication to reduce reservations of preambles or RACH resources are the number of SI increase. In some embodiments, SI messages into divided into SI groups, preamble/RACH resources are only reserved for each of the groups, and SI request windows are implemented. In an example, an SI request window precedes each set of SI windows corresponding to a group of SI messages, and an SI request is transmitted only in an SI request window. The disclosed implementation may increase the efficacy of supporting a greater number of users, which may be ubiquitous in 5G implementations.

24 Claims, 11 Drawing Sheets

(56) References Cited

OTHER PUBLICATIONS

Ericsson, "Open issues of on-demand SI," 3GPP TSG-RAN WG2 #97bis, Spokane, United States of America, Tdoc R2-1702857, 7 pages, Apr. 2017.
Extended European Search Report for European Patent Application No. 18900322.1, dated Nov. 17, 2020.
Office Action for Korean Patent Application No. 10-2020-7023044, dated Jun. 18, 2021, with English summary.
International Search Report and Written Opinion dated Sep. 27, 2018 for International Application No. PCT/CN2018/072267, filed on Jan. 11, 2018 (7 pages).
Mediatek Inc., "NR SI Unicast", 3GPP TSG-RAN2 Meeting #97, Athens, Greece, R2-1701362, 6 pages, Feb. 2017.
Xiaomi, "Si Request Mechanism for On demand Si", 3GPP TSG-RAN WG2 NR Ad Hoc, Spokane, United States of America, R2-1700038, 4 pages, Jan. 2017.

* cited by examiner

GROUP-BASED SYSTEM INFORMATION COMMUNICATION

CROSS REFERENCE TO RELATED APPLICATIONS

This patent document is a continuation of and claims benefit of priority to International Patent Application No. PCT/CN2018/072267, filed on Jan. 11, 2018. The entire content of the before-mentioned patent application is incorporated by reference as part of the disclosure of this application.

TECHNICAL FIELD

This document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to support much deeper coverage and huge number of connections.

SUMMARY

This document relates to methods, systems, and devices for non-contiguous window-based system information (SI) communication. Embodiments of the disclosed technology reduce the amount of preamble and random access channel (RACH) resources that need to be reserved in order to transmit or broadcast SI messages to an increasing number of wireless devices. This is achieved by dividing SI messages into groups, reserving preamble/RACH resources only for each of the groups, and implementing request windows. For example, each SI message corresponds to an SI window, an SI request window precedes each set of SI windows, and an SI request is transmitted only in an SI request window.

In one exemplary aspect, a wireless communication method is disclosed. The method includes grouping system information (SI) messages into a plurality of SI groups, and providing a mapping between (1) each of the plurality of SI groups, (2) a corresponding SI request window, and (3) a corresponding preamble, wherein an SI request communicated in the SI request window and using the preamble identifies the corresponding SI group of the plurality of SI groups.

In another exemplary aspect a wireless communication method is disclosed. The method includes grouping system information (SI) messages into a plurality of SI groups for transmission, providing a mapping between (1) the plurality of SI groups, (2) predetermined preambles used by SI requests, and (3) predetermined reception times for receiving the SI requests, and transmitting a SI group in response to a SI request that is received at a corresponding predetermined reception time and that uses a corresponding predetermined preamble.

In yet another exemplary aspect, a wireless communication method is disclosed. The method includes receiving, from a wireless device, a system information (SI) request at a reception time, wherein the SI request uses a preamble or a random access channel resource based on the reception time, and determining, based on the reception time, a group of SI messages for which the SI request is made.

In yet another exemplary aspect, a wireless communication method is disclosed. The method includes determining a system information (SI) request window for transmitting a SI request for an SI group, wherein the SI group comprises one or more SI messages, and wherein the SI group is associated with a preamble or a random access channel resource, and transmitting the SI request, to a network node, in the SI request window using the preamble or the random access channel resource.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Existing communication systems reserve preambles and/or random access channel (RAC) resources only for system information (SI) requests. However, as the number of required wireless devices and SIs increase, a greater number of corresponding preamble/RACH resources have to be reserved. This increase in reservations may adversely affect the non-SI triggered RACH procedure quite significantly.

Figure 1:
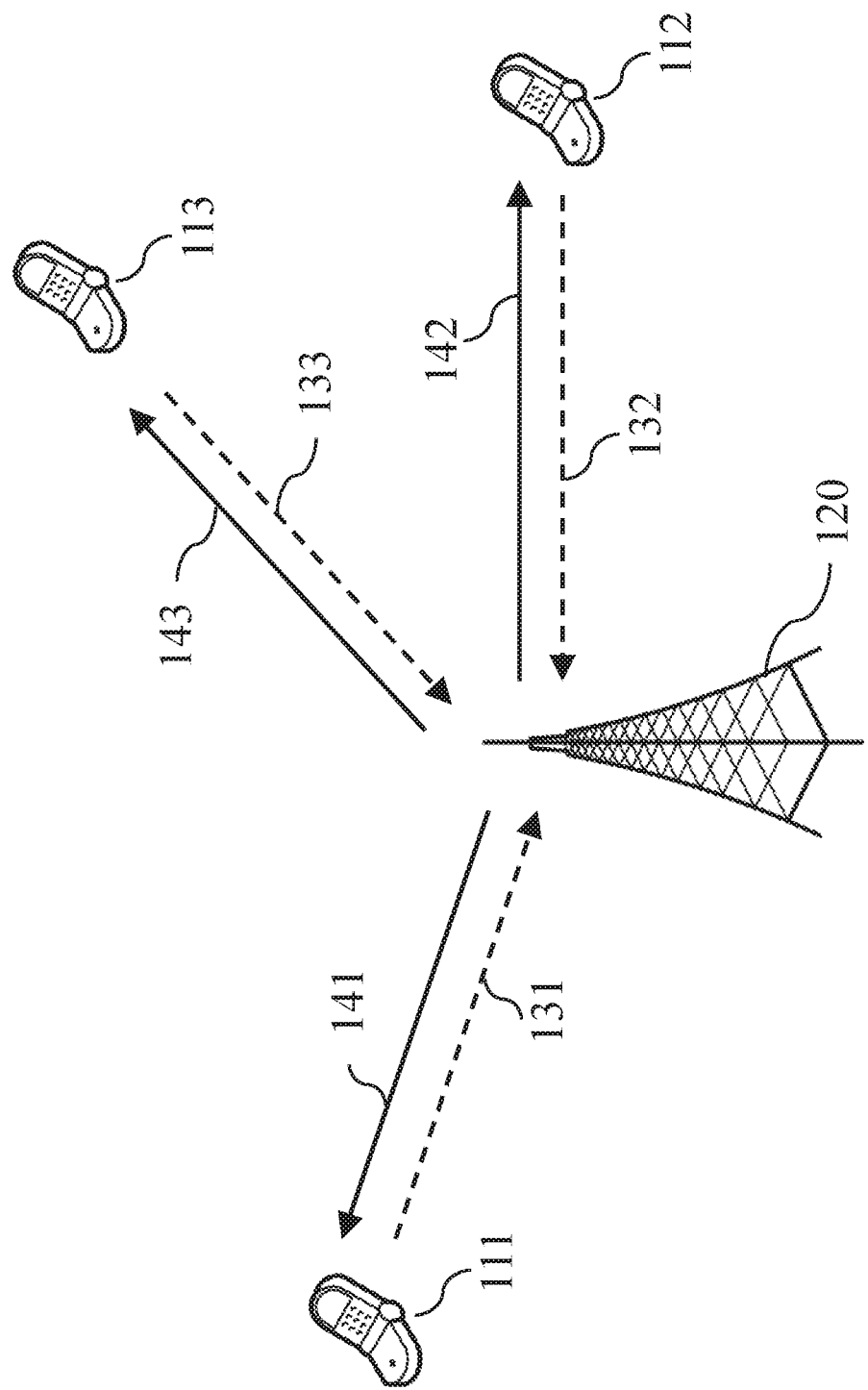
FIG. 1 shows an example of a base station (BS) and user equipment (UE) in wireless communication.

FIG. 1 shows an example of a wireless communication system that includes a base station (BS) 120 and one or more user equipment (UE) 111, 112 and 113. In some embodiments, the base station may broadcast SI information that includes SI groups and corresponding preambles/RACH resources (141, 142, 143) to the UEs. Each of the UEs receives this information and may transmit an SI request (131, 132, 133) in an SI request window using the designated preamble/RACH resources.

In the New Radio (NR) SI implementation, an on-demand SI scheme has been introduced, wherein the network will not always broadcast the on-demand SI periodically, but only broadcast them a limited number of times when a wireless device's SI request is received.

In an example, the user equipment (UE) can support two different SI request schemes; the first being based on Msg1 and the second based on Msg3. Table 1 enumerates possible approaches for the on-demand request of broadcast SI transmissions.

TABLE 1

Possible approaches for on-demand request of broadcast SI transmissions

1: For idle and inactive mode, there will be network control whether MSG1 or MSG3 can be used to transmit SI request.
2: If the PRACH preamble and/or PRACH resource specific to each SIB or set of SIBs which the UE needs to acquire is included in minimum SI then SI request is indicated using MSG 1.
3: If the PRACH preamble and/or PRACH resource specific to each SIB or set of SIBs which the UE needs to acquire is not included in minimum SI then SI request is included in MSG3.

In another example, and for the Msg1-based scheme, possible approaches are enumerated in Table 2.

TABLE 2

Possible Msg-1 based approaches for on-demand request of broadcast SI transmissions 1: For MSG1 based SI request, the minimum granularity of requested SI is one SI message (a set of SIBs as in LTE).
2: For MSG1 based SI request, one RACH preamble can be used to request for multiple SI messages.

Furthermore, there are different possible approaches to map the preamble and/or RACH resources to different SI combinations. In a first example, different preamble/RACH resources are used to indicate different SI combinations, such that if there are n SIs, $2^n-1$ preamble/RACH resources will be reserved. For example, if there are 6 SIs, then $2^6-1=63$ preamble/RACH resources are reserved as shown in Table 3.

TABLE 3

Reservations of preamble/RACH resources for SIs

| pRACH/RACH resources Index | SI combination |
| --- | --- |
| 1 | SI1 |
| 2 | SI2 |
| 3 | SI3 |
| 4 | SI4 |
| 5 | SI5 |
| 6 | SI6 |
| 7 | SI1/2 |
| 8 | SI1/3 |
| 9 | SI1/4 |
| 10 | SI1/5 |
| 11 | SI1/6 |
| 12 | SI2/3 |
| 13 | SI2/4 |
| 14 | SI2/5 |
| 15 | SI2/6 |
| 16 | SI3/4 |
| 17 | SI3/5 |
| 18 | SI3/6 |
| 19 | SI4/5 |
| 20 | SI4/6 |
| 21 | SI5/6 |
| 22 | SI1/2/3 |
| 23 | SI1/2/4 |
| 24 | SI1/2/5 |
| 25 | SI1/2/6 |
| 26 | SI1/3/4 |
| 27 | SI1/3/5 |
| 28 | SI1/3/6 |
| 29 | SI1/4/5 |
| 30 | SI1/4/6 |
| 31 | SI1/5/6 |
| 32 | SI2/3/4 |
| 33 | SI2/3/5 |
| 34 | SI2/3/6 |
| 35 | SI2/4/5 |
| 36 | SI2/4/6 |
| 37 | SI2/5/6 |
| 38 | SI3/4/5 |
| 39 | SI3/4/6 |
| 40 | SI3/5/6 |
| 41 | SI4/5/6 |
| 42 | SI1/2/3/4 |
| 43 | SI1/2/3/5 |
| 44 | SI1/2/3/6 |
| 45 | SI1/2/4/5 |
| 46 | SI1/2/4/6 |
| 47 | SI1/2/5/6 |
| 48 | SI1/3/4/5 |
| 49 | SI1/3/4/6 |
| 50 | SI1/3/5/6 |
| 51 | SI1/4/5/6 |
| 52 | SI2/3/4/5 |
| 53 | SI2/3/4/6 |
| 54 | SI2/3/5/6 |
| 55 | SI2/4/5/6 |
| 56 | SI3/4/5/6 |
| 57 | SI1/2/3/4/5 |
| 58 | SI1/2/3/4/6 |
| 59 | SI1/2/3/5/6 |
| 60 | SI1/2/4/5/6 |
| 61 | SI1/3/4/5/6 |
| 62 | SI2/3/4/5/6 |
| 63 | SI1/2/3/4/5/6 |

In this first example, too many preamble/RACH resources are reserved for the SI requests. As the SIs increase, the non-SI triggered RACH procedure will be adversely affected.

Figure 2:
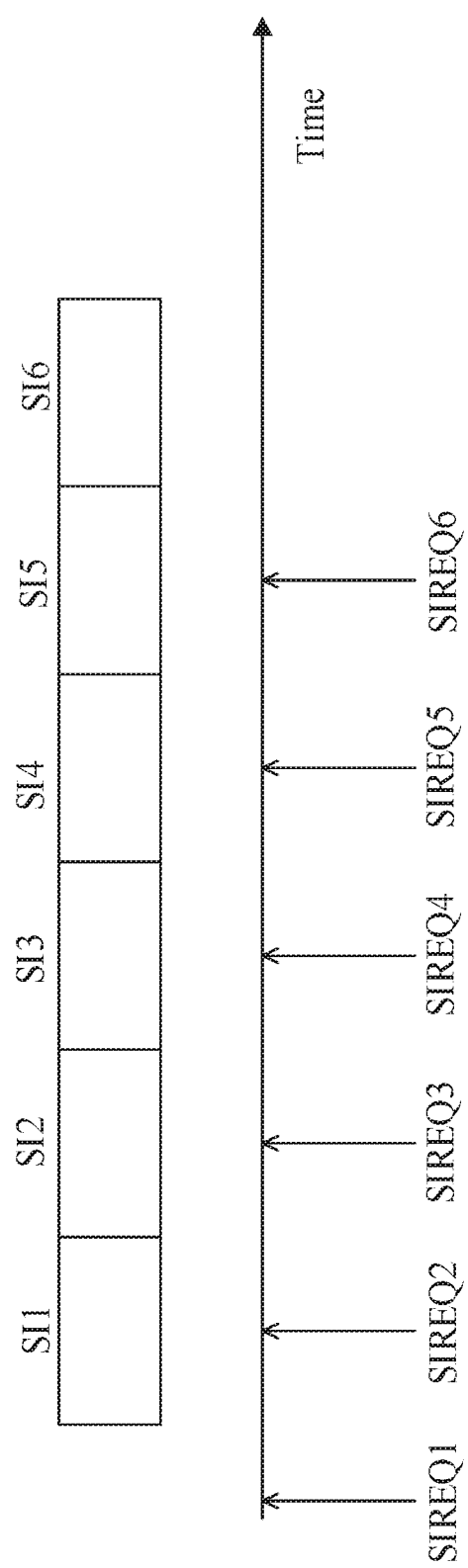
FIG. 2 shows an example of system information (SI) communication.

In a second example, only one preamble/RACH resource is reserved, and is transmitted in a slot that precedes the slot for the requested SI. For example, and as shown in FIG. 2, if the UE wants to request SI1, it should send the SI request (denoted SIREQ) in the slot marked "SIREQ1." Similarly, when the UE wants to request SI2 or SI3, it should send the SI request during the SI1 or SI2 window, respectively.

As seen in this example, the UE can request only one SI in one SI request. Thus, if the UE wants to receive all of the on-demand SIs, the UE has to transmit n preamble/RACH resources, where n is the number of on-demand SIs. Furthermore, in LTE, the minimum SI window is 1 ms (for some special scenarios) or 2 ms, and the SI window is contiguous as shown in FIG. 2. Thus, the UE may have to send the SI request contiguously with the time interval equal to 1 ms/2 ms, which will increase the power consumption.

In some scenarios, the UE may have no chance to re-transmit the SI request, since the SI-window length maybe not be long enough to send 2 preambles especially when the SI-window length is less than 10 ms and the ra-ResponseWindowSize is larger than 2 ms. Note that the UE has to typically wait the duration of a Random Access Response (RAR) before re-transmitting another preamble, and in LTE the interval between two preambles is 3 ms+ra-window length). The Abstract Syntax Notation.One (ASN.1) code, which may be used to define data structures, for this example, is shown in Table 4.

TABLE 4

ASN.1 code for the ResponseWindowSize and WindowLength ra-ResponseWindowSize
    ENUMERATED { sf2, sf3, sf4, sf5, sf6, sf7, sf8, sf10}, (sf means subframe = 1ms)
si-WindowLength
    ENUMERATED { ms1, ms2, ms5, ms10, ms15, ms20, ms40 }

In contrast to the examples described, embodiments of the disclosed technology group SI messages into groups for transmission at certain time windows based on a mapping between grouped SI messages and SI request time windows. Thus, a transmission of one group can support non-contiguous window-based SI communication solutions to reduce the preamble/RACH resource reservations.

In an example, the disclosed technology can be implement to provide a method for wireless communication that includes grouping system information (SI) messages into a plurality of SI groups. Thereafter, a mapping between (1) each of the plurality of SI groups, (2) a corresponding SI request window, and (3) a corresponding preamble is provided. A subsequent SI request communicated in the SI request window and using the preamble identifies the corresponding SI group of the plurality of SI groups.

Figure 3:
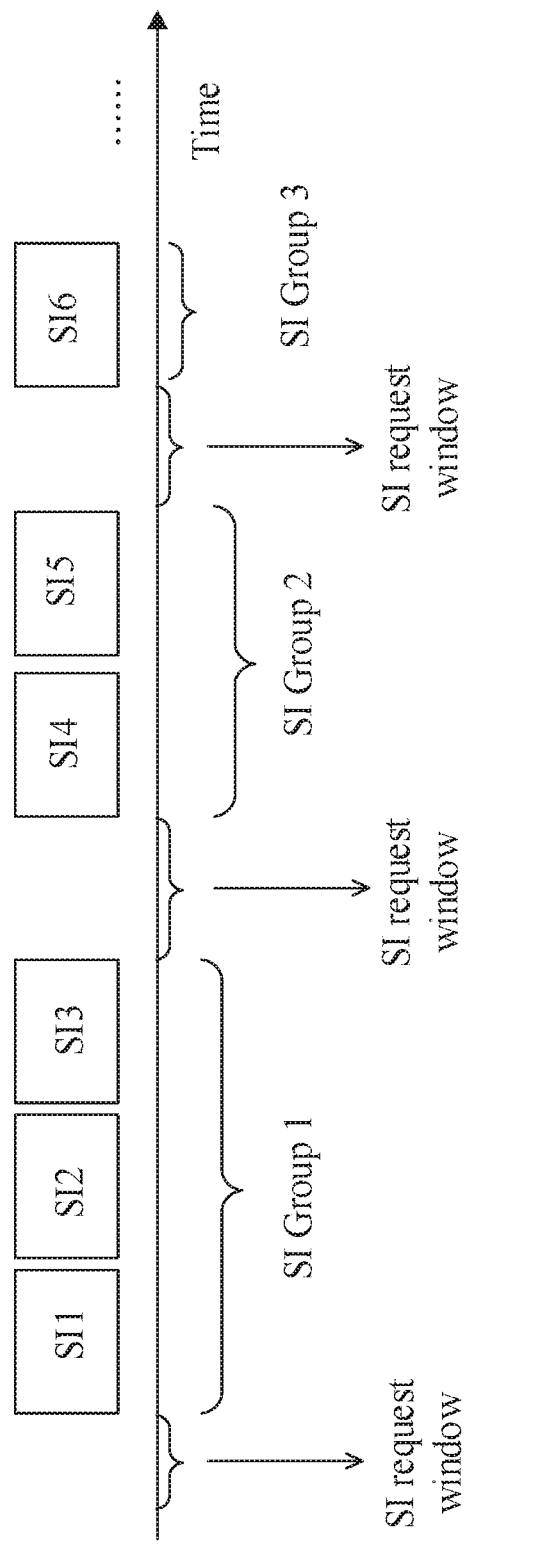
FIG. 3 shows an example of group-based SI communication.

The technology disclosed in this patent document exhibits the following features and advantages:

(1) All the SIs are divided into n groups, the SI windows of the SIs in the same group are contiguous, each SI message is associated with a SI-window. Between the neighbor SI groups (or before the first SI group) there is an SI request window. As shown in the example in FIG. 3, SI Group 1 comprises {SI1, SI2, SI3}, SI Group 2 comprises {SI4, SI5} and SI Group 3 comprises {SI6}. Each of the SI Groups are preceded by an SI request window.

Figure 4:
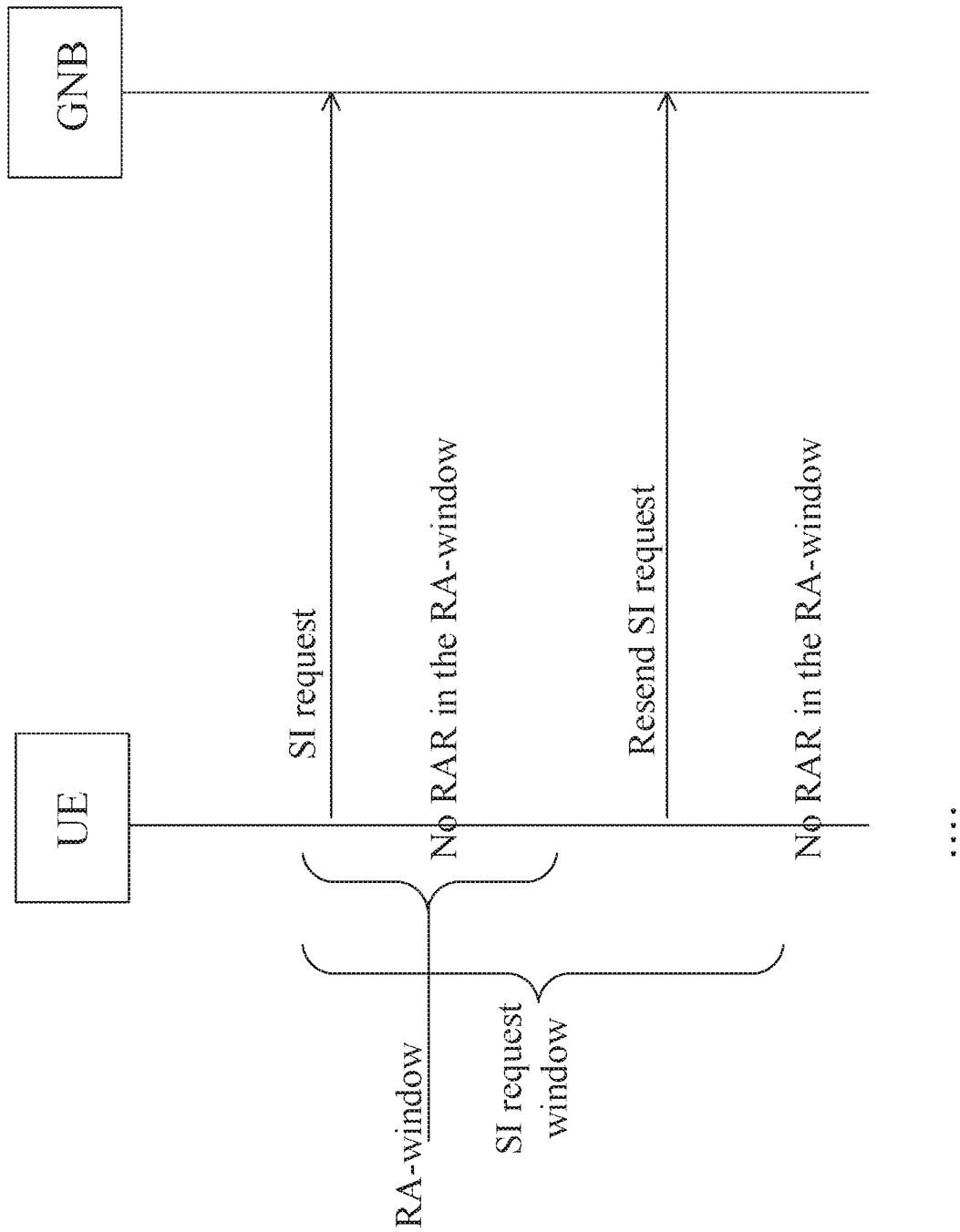
FIG. 4 shows an exemplary timeline for group-based SI communication.

(2) The SI request window may be long enough for the UE and the network node (e.g. gNB) to finish a random access (RA) procedure. The UE may not re-transmit a preamble either when the PREAMBLE_TRASMISSION_COUNTER arrives at the ra_PreambleTx-max or when the SI request window is over, which is shown in FIG. 4. As noted, the UE has to typically wait the duration of an RAR before resending the request.

(3) The network broadcasts SI group information and the duration of SI request windows in the system information. Exemplary ASN.1 code for this feature of embodiments of the disclosed technology is described in Table 5.

TABLE 5

ASN.1 code for feature (3)

SystemInformationBlockType1 ::= SEQUENCE {
    schedulingInfoList            ,
    si-WindowLength               ENUMERATED { ms1, ms2, ms5, ms10, ms15, ms20, ms40 },
    si-RequestWindowLength ENUMERATED { rf1, rf2, rf4, rf8, rf16, rf32, rf64 }
    systemInfoValueTag            INTEGER (0..31),
    nonCriticalExtension          SystemInformationBlockType1-
v890-IEs  OPTIONAL
}

TABLE 5-continued

ASN.1 code for feature (3)

SchedulingInfoList ::= SEQUENCE (SIZE (1..maxSIGroup)) OF SchedulingInfoGroup
SchedulingInfoGroup ::= SEQUENCE (SIZE (1..maxSI-Message)) OF SchedulingInfo
SchedulingInfo ::= SEQUENCE {
    si-Periodicity            ENUMERATED { rf8, rf16, rf32, rf64, rf128, rf256, rf512 },
    sib-MappingInfo
}
SIB-MappingInfo ::= SEQUENCE (SIZE (0..maxSIB-1)) OF SIB-Type In an example, the network node may be initially configured to group system information (SI) messages into a plurality of SI groups in an effort to reduce the preamble/RACH resource reservations. Then, a mapping between (1) the plurality of SI groups, (2) pre-determined preambles used by SI requests, and (3) pre-determined reception times for receiving the SI requests is provided. And finally, a SI group is transmitted in response to a SI request that is received at a corresponding predetermined reception time and that uses a corresponding predetermined preamble.

Figure 5A:
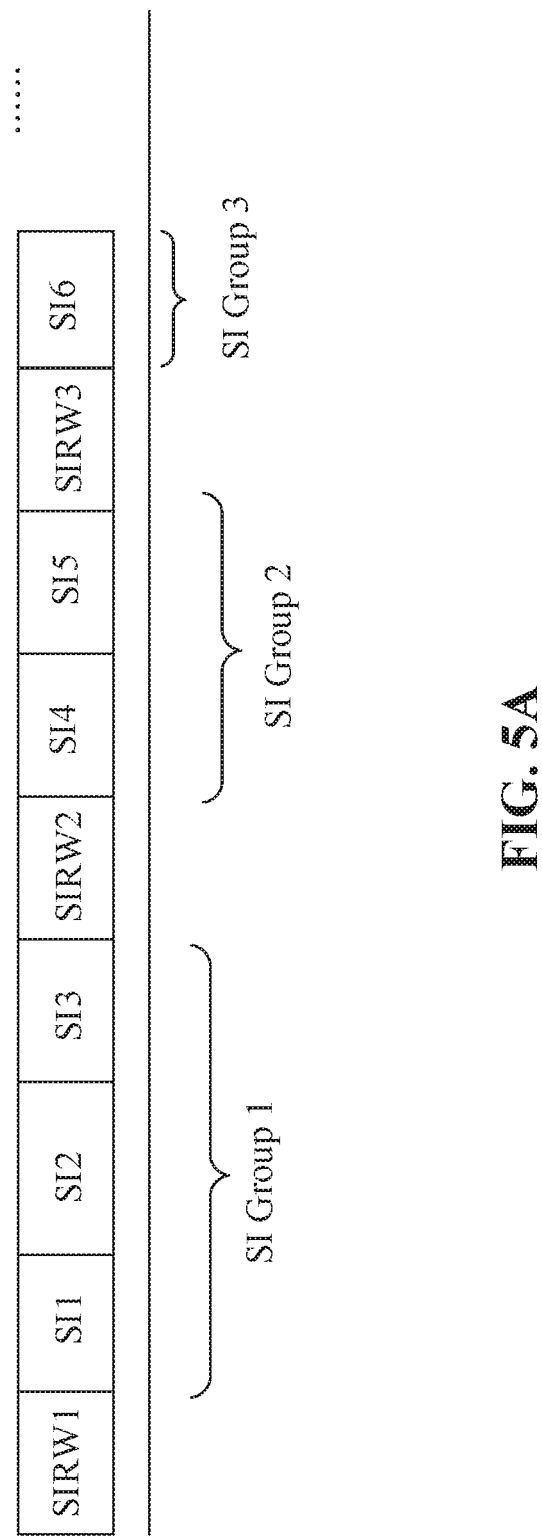
FIGS. 5A, 5B and 5C show other examples of group-based SI communication.

(4) When the UE requests the SIs, the UE sends the corresponding SI request only in the respective SI request windows. In an example where the SI request window and SI windows are non-overlapping, and as shown in FIG. 5A:

(4a) If the UE request SI1/2, the UE should send SI request in the SI request window 1 (denoted SIRW1 in FIG. 5A).

(4b) If the UE request SI1 and SI4, the UE should send a corresponding SI request in SI request window 1 (SIRW1) and then send SI request on SI request window 2 (SIRW2)

(4c) If the UE request SI1, SI4 and SI6, the UE should send a corresponding SI request in SI request window 1 (SIRW1), and then send another SI request on SI request window 2 (SIRW2), at finally send an SI request on SI request window 3 (SIRW3)

Thus, in order to reduce the UE's SI request, the network shall configure all the broadcast SI into one group. In an example, there are two SIs types in NR; one is a broadcast SI type, which is always broadcasting, and the other one is an on-demand SI type.

Figure 5B:
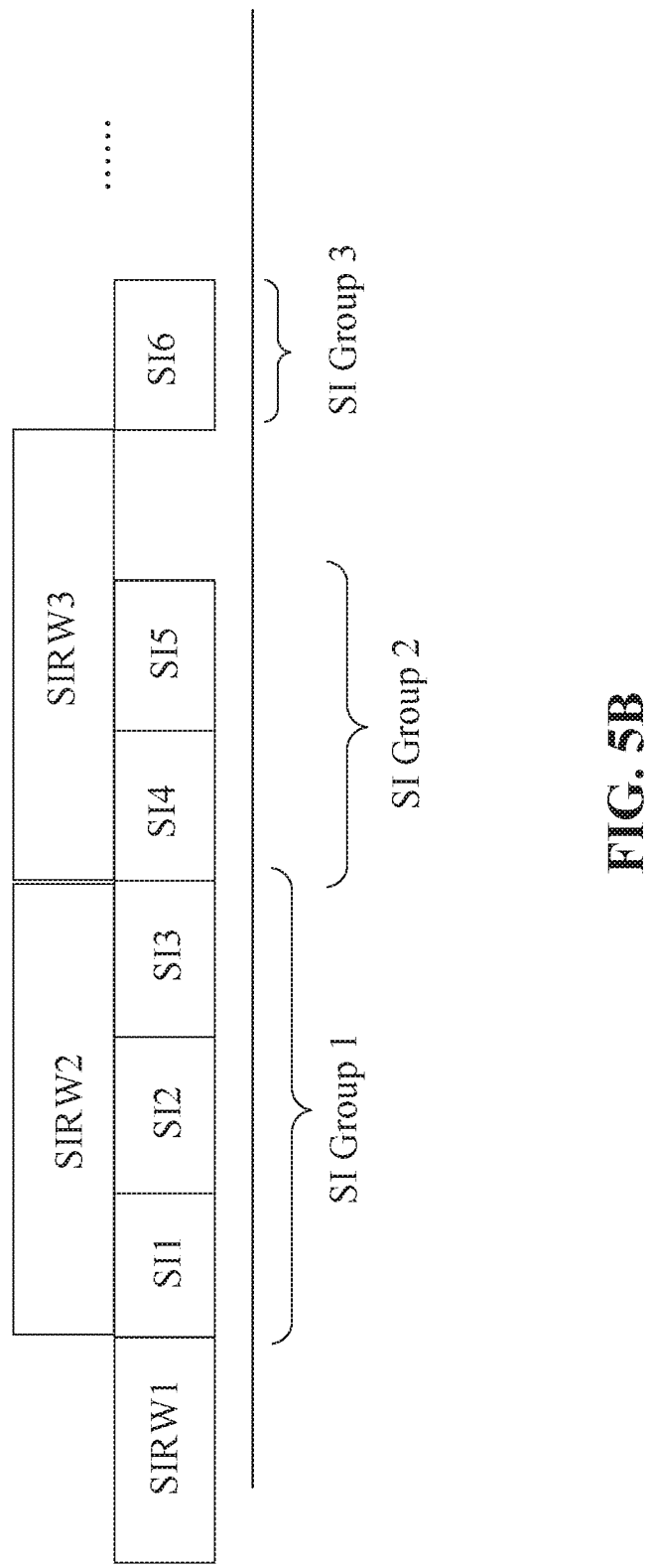
Figure 5C:
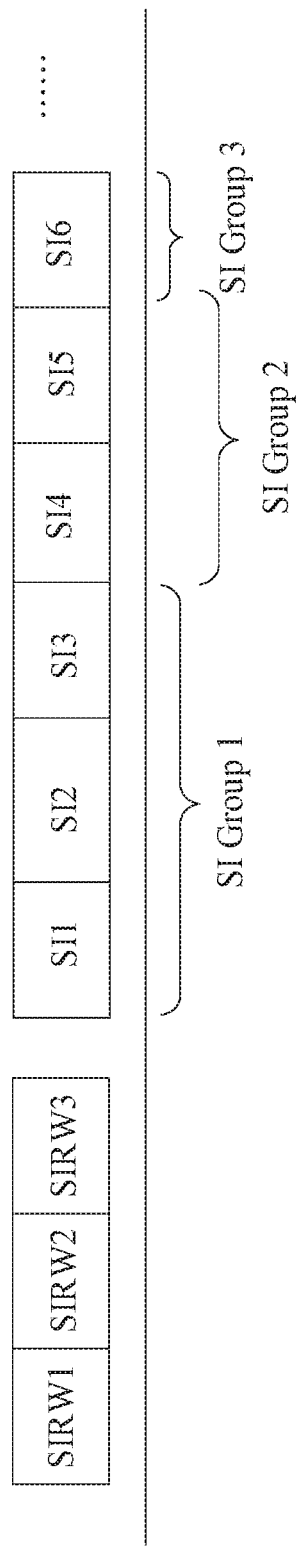

(5) The following two algorithms may be used to determine the start of the SI request window and the start of the SI request window for the SI-group under consideration for various configurations of the disclosed technology, e.g. as shown in FIGS. 5A, 5B and 5C.

Consider the configuration shown in FIG. 5A wherein the SI request window and the SI windows are non-overlapping. First, consider the procedure by which the UE may determine the start of the SI request window for the SI message under consideration:

(i) for the SI message being considered, determine the number n which corresponds to the order of entry in the list of SI messages configured by schedulingInfoList;

(ii) determine the integer value $x=(n-1)*w+k*g*10$, where w is the si-WindowLength, while g is SI request window for SI request, $k=0 \ldots$ MaxSIGroup with $k=0$ corresponding to the first SI Group; and (iii) the SI request window starts at the subframe # a, where $a=x$ mod 10, in the radio frame for which SFN mod $T=FLOOR(x/10)$, where T is the si-Periodicity of the SI message under consideration, and where SFN is the System Frame Number.

Next, consider the procedure by which the UE may determine the start of the SI request window for the SI-group under consideration.

(i) derive the first SI's subframe # a and SFN in each SI group; and (ii) if SFN>=g, SFN SI request window=[SFN−g]mod 1024 & if SFN<g, the start of the SFN SI request window= [SFN+1024−g]mod 1024. Note that the sub-frame of the SI request window start is same as that of the first SI's sub-frame.

In an example that demonstrates the computations of feature (5) for the configuration shown in FIG. 5A, assume that there are 6 on-demand SIs with different periods, as shown in Table 6.

TABLE 6

SI group and SI period definitions for feature (5) computations

| | |
| --- | --- |
| SI Group 1 | SI period 1 = 160 ms |
| | SI period 2 = 160 ms |
| | SI period 3 = 320 ms |
| SI Group 2 | SI period 4 = 320 ms |
| | SI period 5 = 640 ms |
| SI Group 3 | SI period 6 = 640 ms |

It is further assumed that the SI request window length is 10 ms and the SI request window is 40 ms. It may be noted that though in one SI, all of the SIBs in one SI having the same period does not imply that all the SIBs with the same period should be put into the same SI. Thus, in this example, the different SIs may have the same period. The computations for this example, according to the rules defined in feature (5), are shown in Table 7.

TABLE 7

Exemplary computations for feature (5)

| SI | x (ms) | FLOOR (x/10) | Period T | SFN mod T = FLOOR(x/10) | SFN (n = 0, 1, ...) | a = x mod 10 | Start SFN of SI Request window (n = 0, 1, ...) |
| --- | --- | --- | --- | --- | --- | --- | --- |
| SI1 | 0 | 0 | 160 ms(16) | SNFmod 16 = 0 | 16n | 0 | (16n − 4)mod 1024 (if n = 0, the start SFN is 1020) |
| SI2 | 10 | 1 | 160 ms(16) | SNFmod 16 = 1 | 16n + 1 | 0 | (16n − 4)mod 1024 (if n = 0, the start SFN is 1020) |
| SI3 | 20 | 2 | 320 ms(32) | SNFmod 32 = 2 | 32n + 2 | 0 | (16n − 4)mod 1024 (if n = 0, the start SFN is 1020) |
| SI4 | 70 | 7 | 320 ms(32) | SNFmod 32 = 7 | 32n + 7 | 0 | (32n + 3)mod1024 |
| SI5 | 80 | 8 | 640 ms(64) | SFNmod 64 = 8 | 64n + 4 | 0 | (32n + 3)mod1024 |
| SI6 | 130 | 13 | 640 ms(64) | SFNmod 64 = 13 | 64n + 13 | 0 | (64n + 9)mod1024 |

In the configuration shown in FIG. 5B, the SI request windows and SI windows may overlap, but the SI request windows are non-overlapping. Furthermore, the configuration allows for gaps between neighboring SI groups. For this configuration, first consider the procedure by which the UE may determine the start of the SI request window for the SI message under consideration:

(i) for the SI message being considered, determine the number n which corresponds to the order of entry in the list of SI messages configured by schedulingInfoList;

(ii) determine the integer value x=(n−1)*w+SI group gap1+ ... SI group gap k, where w is the si-WindowLength, while g is SI request window for SI request, SI group gap is the gap between two neighbor SI groups, and k is the gap numbers before this SI; and the SI request window starts at the subframe # a, where a=x mod 10, in the radio frame for which SFN mod T=FLOOR(x/10), where T is the si-Periodicity of the SI message under consideration, and where SFN is the System Frame Number.

Next, consider the procedure by which the UE may determine the start of the SI request window for the SI-group under consideration:

(i) derive the first SI's subframe # a and SFN in each SI group; and (ii) if SFN>=g, SFN SI request window=[SFN−g]mod 1024 & if SFN<g, the start of the SFN SI request window= [SFN+1024−g]mod 1024. Note that the sub-frame of the SI request window start is same as that of the first SI's sub-frame.

For the configuration shown in FIG. 5C, the start point of the SI request window is independent of the corresponding SI window. In some embodiments, an absolute start point and duration may be defined and broadcasted in the system information. In other embodiments, it may be calculated based on the SFN, the SI period, the SFN offset or other parameters.

(6) For the SI request window, the gNB may only reserve necessary preamble/RACH resource according to the number of SIs followed by this request window. In some embodiments, reserving the necessary preamble/RACH resources includes providing a mapping between (1) SI messages in SI groups, (2) the starting positions of the request windows, and (3) the preamble and/or RACH resource. Except for the SI request window, the gNB does not need to reserve any preamble/RACH resources for the SI request.

(7) UE sends the SI request with the corresponding pRACH/RACH resources according to the number of SIs followed by this request window.

Figure 6:
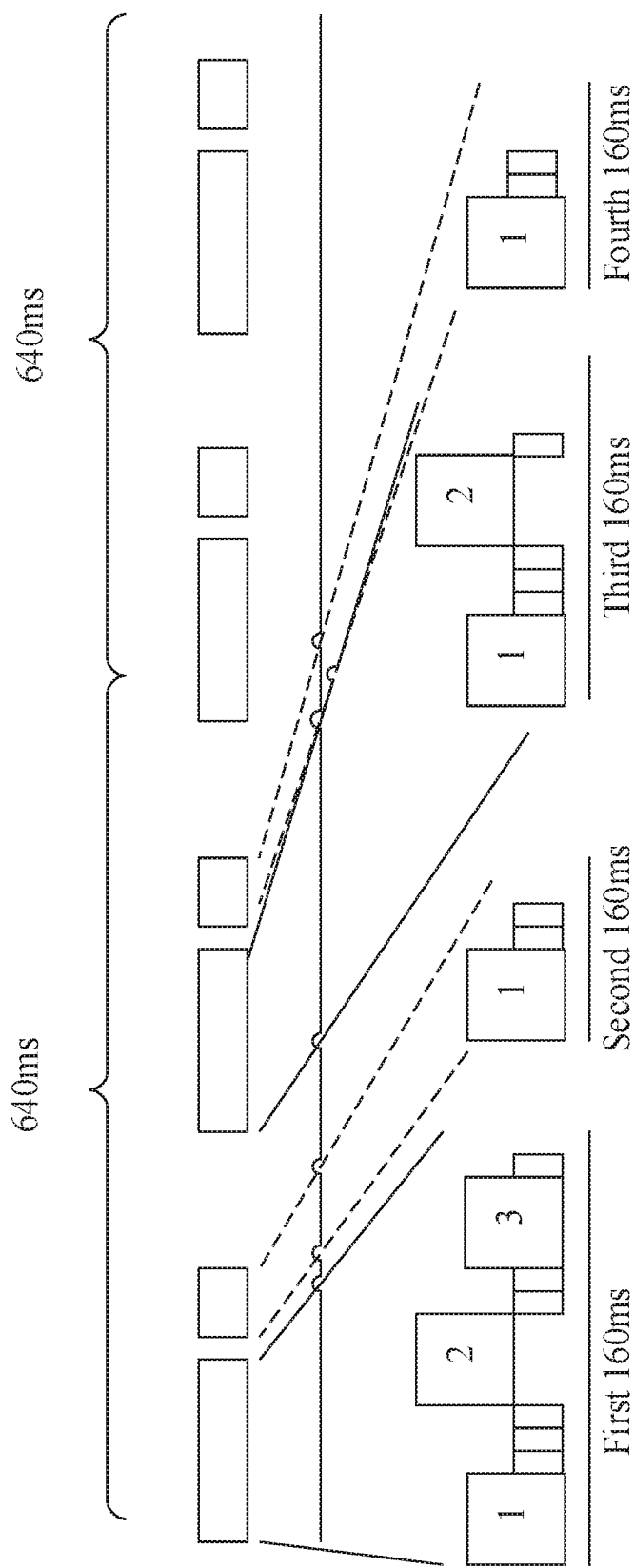
FIG. 6 shows an example of mapping relationships in group-based SI communication.

Continuing with the example described in the context of Table 6, FIG. 6 shows 3 SI groups, and preceding each group there is an SI request window numbered 1/2/3. Note that an SI request window with the same index may have different SIs following it. For example, and as shown in FIG. 6, in the first 160 ms, there are 3 SIs (SI1/2/3) preceded by SI request window 1, whereas in the second 160 ms, there are only 2 SI (SI1/2, but no SI3). For this set, the period of SI3 is 320 ms.

It is now further assumed that the network reserves $2^3-1=7$ pRACH/RACH resources (where 3 is the maximum number of SIs in one SI group). Then, for SI request window 1 in the first 160 ms, the mapping relationship between pRACH/RACH resources may be set up as shown in Table 8.

TABLE 8

Mapping relationship for first 160 ms for SI request window 1 in FIG. 6

| pRACH/RACH resources Index | SI Combination |
|---|---|
| 1 | SI1 |
| 2 | SI2 |
| 3 | SI3 |
| 4 | SI1/2 |
| 5 | SI1/3 |
| 6 | SI2/3 |
| 7 | SI1/2/3 |

At the network side, when the gNB receives a preamble in SI request window 1, the gNB will first check whether this preamble/RACH resource belongs to Table 8, and if it does, it will broadcast the corresponding SIs as defined in Table 8. If not, it will process it as a non-SI request preamble.

For the SI request window in the second 160 ms, there is only SI1/2, so only the pRACH/RACH resources with index 1/2/4 are needed as shown in Table 9.

TABLE 9

Mapping relationship for second 160 ms for SI request window 1 in FIG. 6

| pRACH/RACH resources Index | SI Combination |
|---|---|
| 1 | SI1 |
| 2 | SI2 |
| 4 | SI1/2 |

This implies that during this SI request window (SI request window 1 of the second 160 ms), the pRACH/RACH resources with indexes 3/5/6/7 can be used by the non-SI request RACH procedure, such as normal RRCC connection establish procedure.

Similarly, for SI request window 2 in the first 160 ms, only SI4/5 is followed by the SI request window, and thus only the pRACH/RACH resources with index 1/2/3 are needed as shown in Table 10.

TABLE 10

Mapping relationship for first 160 ms for SI request window 2 in FIG. 6

| pRACH/RACH resources Index | SI Combination |
|---|---|
| 1 | SI4 |
| 2 | SI5 |
| 3 | SI4/5 |

This implies that during this SI request window (SI request window 2 of the first 160 ms), the pRACH/RACH resources with index 4/5/6/7 can be used by the non-SI request RACH procedure, such as normal RRCC connection establish procedure.

And similarly, for SI request window 3 in the first 160 ms, only SI6 is followed by the SI request window, and thus only the pRACH/RACH resources with index 1 is needed as shown in Table 11.

TABLE 11

Mapping relationship for first 160 ms for SI request window 3 in FIG. 6

| pRACH/RACH resources Index | SI Combination |
|---|---|
| 1 | SI6 |

This implies that during this SI request window (SI request window 3 of the first 160 ms), the pRACH/RACH resources with index 2/3/4/5/6/7 can be used by the non-SI request RACH procedure, such as normal RRCC connection establish procedure.

Tables 9-11 are examples of the mapping between SI groups and preamble/RACH resources, wherein each table is also mapped to a specific SI request window. As discussed in this patent document, the mapping described by the disclosing technology can support non-contiguous window-based SI communication solutions to reduce the preamble/RACH resource reservations.

Figure 7:
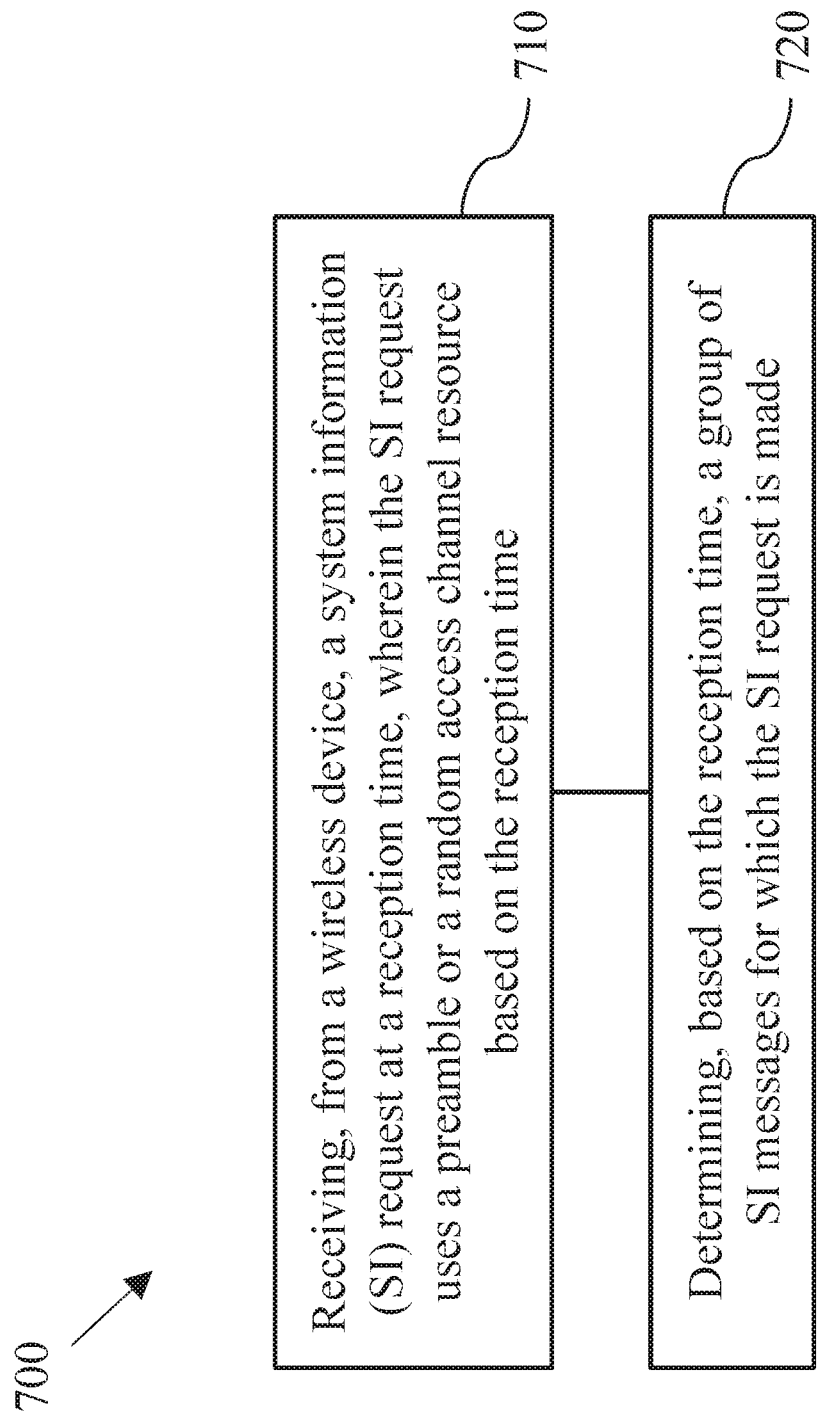
FIG. 7 shows an example of a wireless communication method carried out on a communication node (or network node) for group-based SI communication.

FIG. 7 shows an example of a wireless communication method carried out on a communication node (or network node), in accordance with some embodiments of the presently disclosed technology. The method 700 includes, at step 710, receiving, from a wireless device, a system information (SI) request at a reception time, wherein the SI request uses a preamble or a random access channel resource based on the reception time. In some embodiments, the method may include grouping SI messages into a plurality of SI groups. In other embodiments, the grouping may be predetermined or specified by a standards specification.

In some embodiments, the network node may broadcast the system information to the UEs in its area of coverage. In an example, the broadcasted SI may include the grouping of the SI messages so UEs may subsequently transmit SI requests. In another example, the broadcasted SI may include durations of the SI windows and/or the SI request windows.

In some embodiments, the duration of each SI window corresponding to an SI message in an SI group may be equal. In other embodiments, the duration of the SI windows in an SI group may be different. As discussed in the context of FIGS. 5 and 6, the SI windows are non-overlapping, and each group of SI windows is preceded by an SI request window.

The method includes, at step 720, determining, based on the reception time, a group of SI messages for which the SI request is made. In some embodiments, the reception time falls within a specific SI request window, thereby identifying the SI group that follows the SI request window as the one that includes the SI messages for which the SI request is made.

Figure 8:
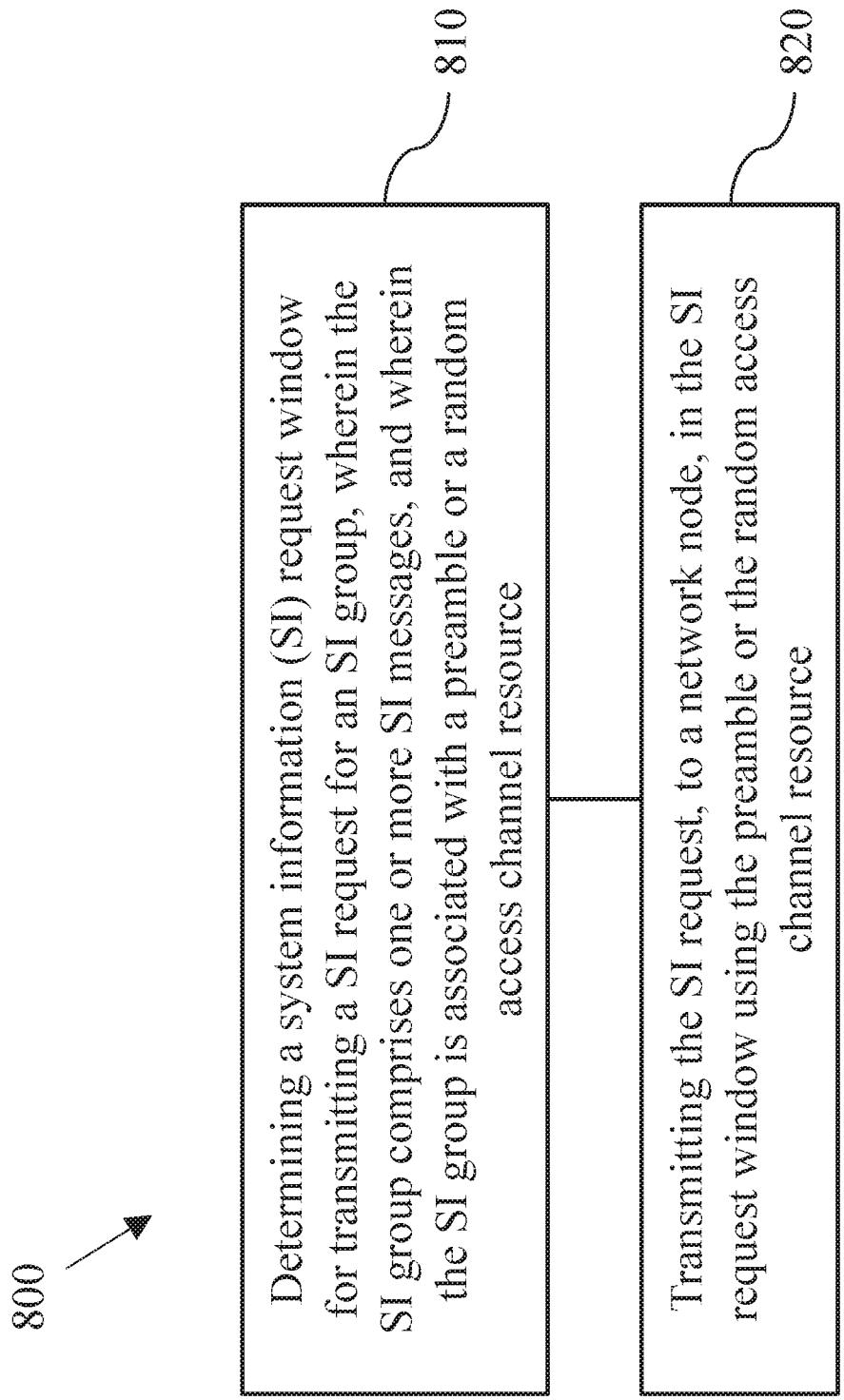
FIG. 8 shows an example of a wireless communication method carried out on a wireless communication apparatus (or user equipment) for group-based SI communication.

FIG. 8 shows an example of a wireless communication method carried out on a wireless communication apparatus (or user equipment), in accordance with some embodiments of the presently disclosed technology. This example may include some features and/or steps that are similar to those shown in FIG. 7, and described in this document. At least some of these features and/or components may not be separately described in this section.

The method 800 includes, at step 810, determining a system information (SI) request window for transmitting a SI request for an SI group, wherein the SI group comprises one or more SI messages, and wherein the SI group is associated with a preamble or a random access channel resource. In some embodiments, the method may further include receiving broadcasted SI which includes information of the grouping of SI messages and durations of the SI request window. This information may be used to configure and transmit an SI request.

The method 800 includes, at step 820, transmitting the SI request, to a network node, in the SI request window using the preamble or the random access channel resource. In some embodiments, the UE may retransmit (or resend) the SI request if a Random Access Response (RAR) is not received within an RAR window. In other embodiments, the UE may refrain from transmitting another SI request if it is determined that a value of PREAMBLE_TRASMISSION_COUNTER equals a value of ra_PreambleTx max or if the SI request window has expired.

Figure 9:
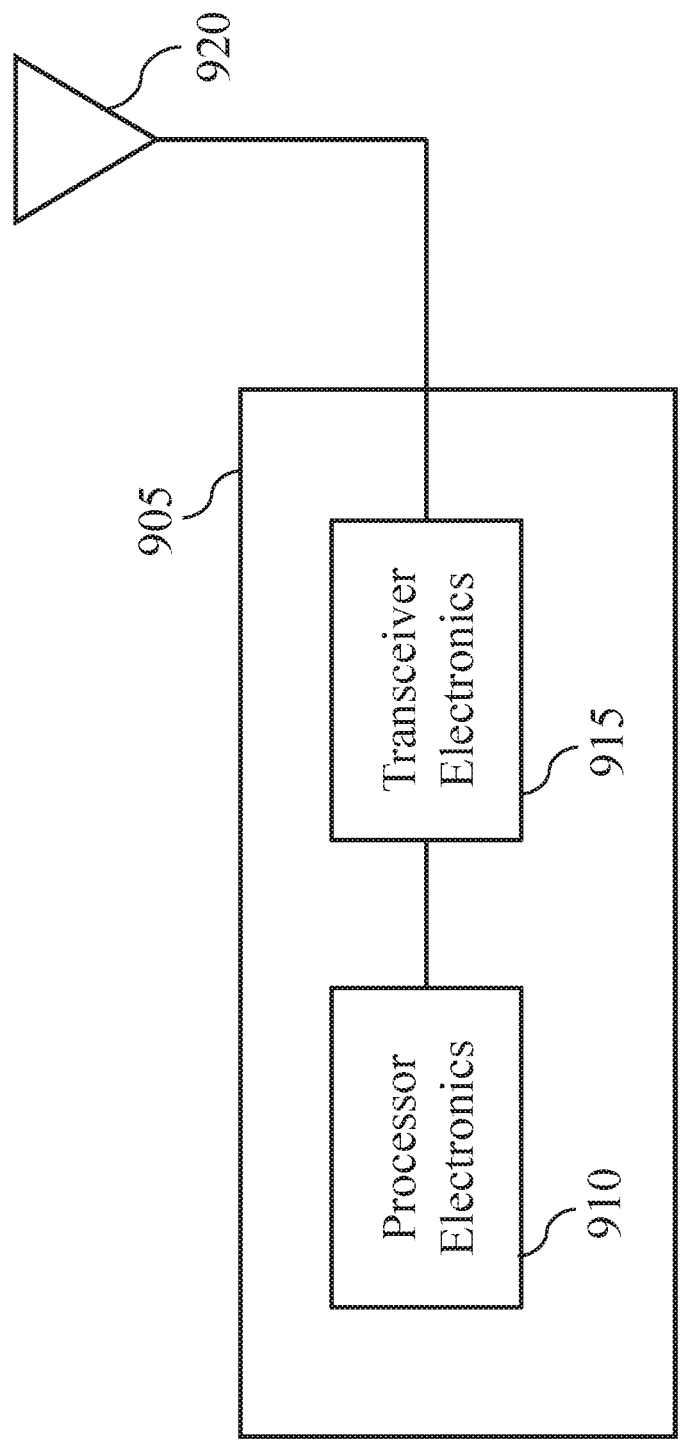
FIG. 9 is a block diagram representation of a portion of a radio station, in accordance with some embodiments of the presently disclosed technology.

FIG. 9 is a block diagram of an example apparatus that may implement a method or technique described in this documents (e.g. method 700 or 800). The apparatus 905, such as a base station or a wireless device (or UE), can include processor electronics 910 such as a microprocessor that implements one or more of the techniques presented in this document. The radio station 905 can include transceiver electronics 915 to send and/or receive wireless signals over one or more communication interfaces such as antenna(s) 920. The apparatus 905 can include other communication interfaces for transmitting and receiving data. Apparatus 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the apparatus 905.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, implemented at a network node, the method comprising:
receiving, from a wireless device, a system information (SI) request at a reception time, wherein the SI request uses a preamble or random access channel (RACH) resources based on the reception time;
determining, based on the reception time, a group of SI messages for which the SI request is made;
grouping SI messages into a plurality of SI groups, wherein the plurality of SI groups comprises the group of SI messages; and
broadcasting information corresponding to the grouping into the plurality of SI groups.

2. The method of claim 1, further including:
determining, based on an identification of the preamble or the RACH resources used by the SI request, one or more SI messages from the group of SI messages for which the SI request was made; and
transmitting the one or more SI messages.

3. The method of claim 1, wherein each of the group of SI messages is associated with a respective SI window of a group of SI windows, wherein each of the group of SI windows is preceded by a corresponding SI request window, wherein the reception time falls within a SI request window, and wherein the SI request windows for each of the group of SI windows are non-overlapping.

4. The method of claim 3, wherein a random access procedure between the network node and the wireless device is completed in a duration of the SI request window.

5. The method of claim 3, wherein a duration of each of the group of SI windows are equal.

6. The method of claim 3, wherein a duration of at least one of the group of SI windows is not equal to a duration of at least another of the group of SI windows.

7. The method of claim 3, further comprising:
broadcasting system information comprising a duration of the SI request window and/or parameters based on a starting point of the SI request window, wherein the parameters comprise at least one of a system frame number (SFN) and an offset SFN.

8. A method for wireless communication, implemented at a wireless device, the method comprising:
determining a system information (SI) request window for transmitting a SI request for an SI group, wherein the SI group comprises one or more SI messages, and wherein the SI group is associated with a preamble or random access channel (RACH) resources, wherein each SI message from the SI group is associated with a respective SI window of a group of SI windows, wherein the group of SI windows is preceded by a corresponding SI request window, and wherein a transmission time falls within the SI request window; and
transmitting the SI request, to a network node, in the SI request window using the preamble or the RACH resources.

9. The method of claim 8, further comprising:
receiving, from the network node, information corresponding to a plurality of SI groups, wherein the plurality of SI groups comprises the SI group.

10. The method of claim 8, further comprising:
receiving the one or more SI messages.

11. The method of claim 8, further comprising:
receiving a duration of the SI request window.

12. The method of claim 8, wherein a random access procedure between the network node and the wireless device is completed in a duration of the SI request window.

13. The method of claim 8, wherein a duration of each of the group of SI windows is equal.

14. The method of claim 8, wherein a duration of at least one of the group of SI windows is not equal to a duration of at least another of the group of SI windows.

15. The method of claim 8, further comprising:
determining that a Random Access Response (RAR) is not received within an RAR window; and
in response to the RAR not being received within the RAR window, resending, in the SI request window, the SI request.

16. The method of claim 8, further comprising:
determining that at least one of a timer or the SI request window have expired, wherein the timer expires when a value of PREAMBLE_TRASMISSION_COUNTER equals a value of r_PreambleTx-max; and
in response to the at least one of the timer or the SI request window expiring, refraining from transmitting another SI request.

17. An apparatus for wireless communication comprising:
a processor configured to:
group system information (SI) messages into a plurality of SI groups for transmission, and
provide a mapping between (1) the plurality of SI groups, (2) predetermined preambles used by SI requests, and (3) predetermined reception times for receiving the SI requests; and
a transmitter configured to transmit a SI group in response to a SI request that is received, from a wireless device, at a corresponding predetermined reception time and that uses a corresponding predetermined preamble.

18. The apparatus of claim 17, wherein the transmitter is further configured to broadcast system information comprising a duration of the SI request window, a starting point of the SI request window, a system frame number (SFN), or an offset SFN.

19. A network node for wireless communication, comprising:
a processor configured to:
receive, from a wireless device, a system information (SI) request at a reception time, wherein the SI request uses a preamble or random access channel (RACH) resources based on the reception time;
determine, based on the reception time, a group of SI messages for which the SI request is made;
group SI messages into a plurality of SI groups, wherein the plurality of SI groups comprises the group of SI messages; and
broadcast information corresponding to the grouping into the plurality of SI groups.

20. The network node of claim 19, wherein each of the group of SI messages is associated with a respective SI window of a group of SI windows, wherein each of the group of SI windows is preceded by a corresponding SI request window, wherein the reception time falls within a SI request window, and wherein the SI request windows for each of the group of SI windows are non-overlapping.

21. The network node of claim 20, wherein a random access procedure between the network node and the wireless device is completed in a duration of the SI request window.

22. A wireless device for wireless communication, comprising:
a processor configured to:
determine a system information (SI) request window for transmitting a SI request for an SI group, wherein the SI group comprises one or more SI messages, and wherein the SI group is associated with a preamble or random access channel (RACH) resources, wherein each SI message from the SI group is associated with a respective SI window of a group of SI windows, wherein the group of SI windows is preceded by a corresponding SI request window, and wherein a transmission time falls within the SI request window; and
transmit the SI request, to a network node, in the SI request window using the preamble or the RACH resources.

23. The wireless device of claim 22, wherein a random access procedure between the network node and the wireless device is completed in a duration of the SI request window.

24. The wireless device of claim 22, wherein a duration of each of the group of SI windows is equal.

* * * * *

UNITED STATES PATENT AND TRADEMARK OFFICE
CERTIFICATE OF CORRECTION

PATENT NO. : 11,284,447 B2
APPLICATION NO. : 16/926424
DATED : March 22, 2022
INVENTOR(S) : Wenting Li et al.

It is certified that error appears in the above-identified patent and that said Letters Patent is hereby corrected as shown below:

On the Title Page

On Page 2, in Item (56), under "OTHER PUBLICATIONS", in Column 1, Line 13, delete ""Si Request Mechanism for On demand Si"," and insert -- "SI Request Mechanism for On demand SI", --, therefor.

In the Specification

In Column 2, Line 53, delete "random access channel (RAC)" and insert -- random access channel (RACH) --, therefor.

In Column 3, Line 19, delete "MSG 1." and insert -- MSG1. --, therefor.

In Column 5, Line 1, delete "wait" and insert -- wait for --, therefor.

In Column 5, Line 4, delete "length)." and insert -- length. --, therefor.

In Column 5, Lines 24-25, delete "implement" and insert -- implemented --, therefor.

In Column 5, Line 49, delete "wait" and insert -- wait for --, therefor.

In Column 6, Line 34, delete "(SIRW2)" and insert -- (SIRW2). --, therefor.

In Column 6, Line 38, delete "at finally" and insert -- finally --, therefor.

In Column 6, Line 39, delete "(SIRW3)" and insert -- (SIRW3). --, therefor.

In Column 6, Line 63, delete "# a," and insert -- #a, --, therefor.

In Column 7, Line 4, delete "# a" and insert -- #a --, therefor.

Signed and Sealed this
Seventh Day of June, 2022

*Katherine Kelly Vidal*

Katherine Kelly Vidal
*Director of the United States Patent and Trademark Office*

CERTIFICATE OF CORRECTION (continued)
U.S. Pat. No. 11,284,447 B2

In Column 8, Line 1, delete "# a," and insert -- #a, --, therefor.

In Column 8, Line 9, delete "# a" and insert -- #a --, therefor.

In the Claims

In Column 13, Line 60, in Claim 16, delete "r_PreambleTx-max;" and insert -- ra_PreambleTx-max; --, therefor.